Feb. 24, 1959 M. J. KAHAN 2,874,629
COFFEE EXTRACTING APPARATUS
Filed Dec. 21, 1955 3 Sheets-Sheet 1
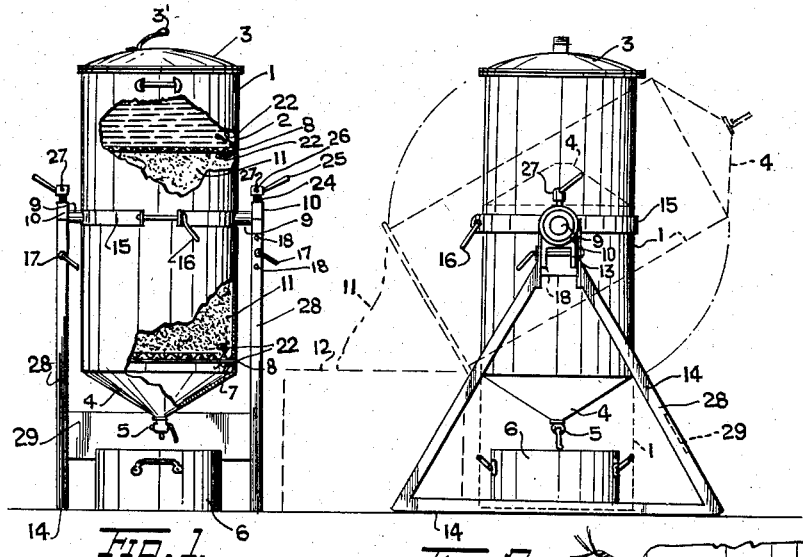
Fig. 1.
Fig. 2.
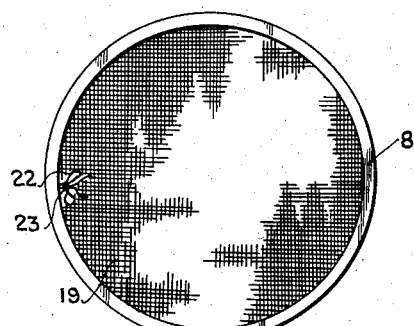
Fig. 3.
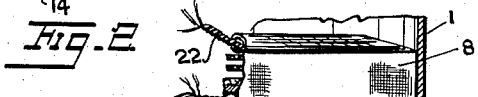
Fig. 4.
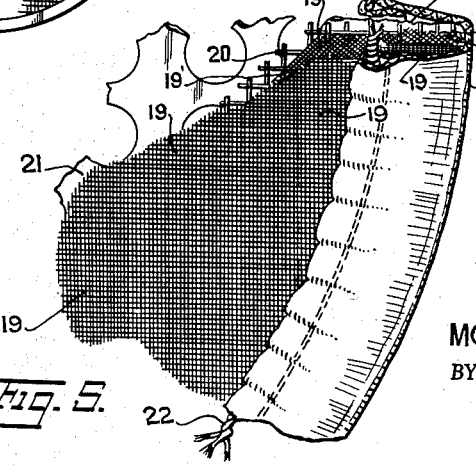
Fig. 5.
INVENTOR.
MORTIMER J. KAHAN
BY
ATTORNEY

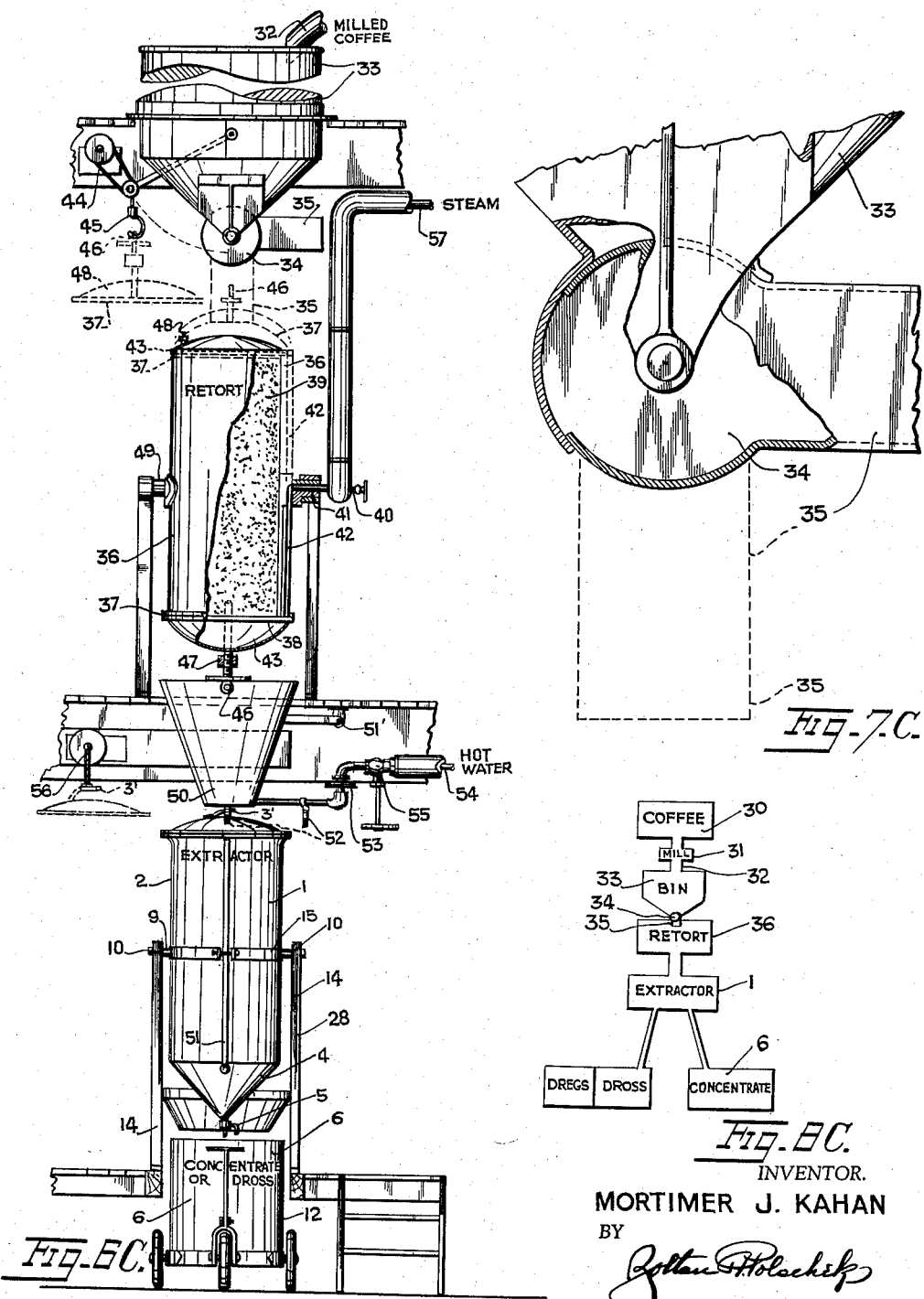

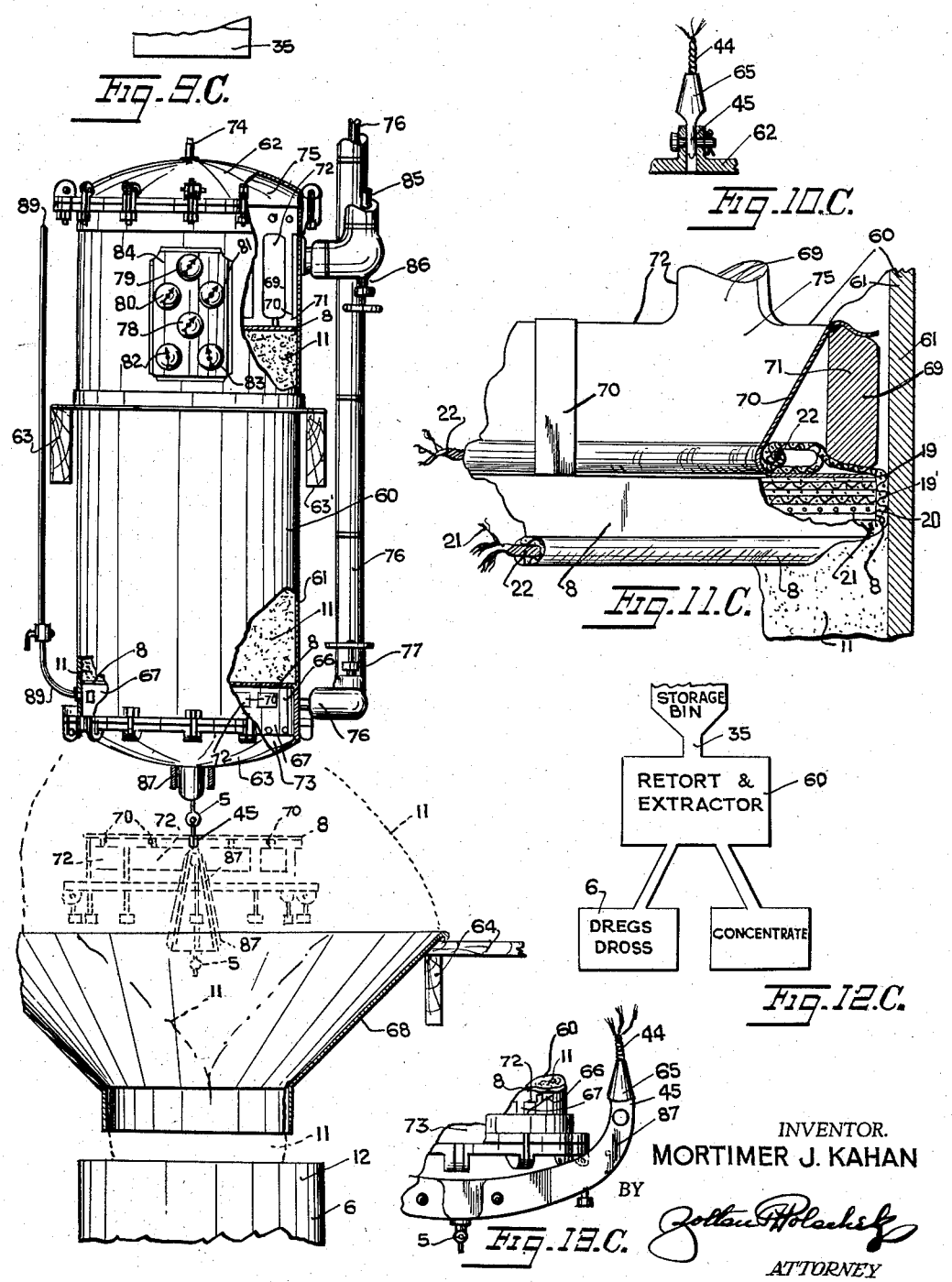

United States Patent Office 2,874,629
Patented Feb. 24, 1959

2,874,629
COFFEE EXTRACTING APPARATUS
Mortimer J. Kahan, New York, N. Y.
Application December 21, 1955, Serial No. 554,452
1 Claim. (Cl. 99—298)

This invention relates to apparatus and process for treating coffee so as to extract the soluble constituents thereof to obtain a liquid coffee concentrate, and this application is a continuation in part of my application Serial No. 264,965 filed January 4, 1952, now Patent No. 2,770,181 dated November 13, 1956.

A principal object of the present invention is to provide apparatus and a process for treating coffee to extract the soluble constituents thereof and separate the same from the insoluble and fibrous parts and thereby provide a liquid coffee concentrate or extract which concentrate and the beverage retain all of the natural aroma and taste of freshly prepared coffee.

Another object of the invention is to provide a process for treating coffee with steam to extract the soluble constituents thereof and separate the same from the insoluble and fibrous parts whereby the quality of the coffee extract is enhanced and the percentage of yield per pound of coffee is increased.

A further object of the invention is to provide a process of this kind for the treatment of coffee which can be economically carried out on a large scale.

Another object is to provide an extractor having an internal annulus and a cooperating peripheral strainer retainer for securing a plurality of strainer elements and to seal the elements in cooperation with said annulus as a gasket.

An object is to provide an annular flexible removable securing member such as an endless fabric band having hollow border hems, each hem having a draw string for securing a plurality of strainers to each other as a unit, one draw string above and the other draw string below the strainers, and the fabric between the hollow hems and draw strings providing a gasket to cooperate with the container or vessel for the extractor to seal against leakage around the strainers.

An object is to provide upper and lower strainers having packing means to provide leakage around either or both of said strainers and the vessel.

An object is to provide a container and vessel for extracting the full flavor of coffee from the solids, whereby 10 percent to 15 percent soluble solids of pure coffee concentrate is extracted.

An object is to provide a container and vessel having a pair of trunnions and a frame for tilting the vessel for emptying the coffee grounds by substantially inverting the vessel.

An object is to provide an extractor for extracting 10 percent to 15 percent soluble solids and a retort for steaming coffee before extracting to increase the soluble solids extracted to 25 to 30 percent soluble solids.

A further object is to provide movable trunnion supporting means for adjusting the position of the trunnions with relation to the ends of the coffee extractor vessel.

An object is to provide convenient holding means for holding the vessel at any desired predetermined position as when rotated on its trunnion mounting.

An object is to provide a container and vessel for extracting pure coffee concentrate from the mass of coffee solids too heavy to be handled otherwise by manual effort.

An object is to provide a plurality of strainers each separable from each other and having a varying degree of coarseness from very fine to heavy and coarse whereby the heavy coarse strainer supports the finer strainers and the coffee mass which is too heavy to be supported by the finer strainers.

I accomplish these and other objects by the construction herein set forth and shown in the accompanying drawings which from a part of this disclosure;

Fig. 1 is a front elevation of the improved coffee extracting apparatus with parts broken away to show the interior.

Fig. 2 is a side elevation, the vessel being shown tilted in dash lines.

Fig. 3 is a plan view of one of the strainer units.

Fig. 4 is a fragmentary section of a strainer unit.

Fig. 5 is a fragmentary detail of a portion of a strainer unit.

Fig. 6C is a side elevational view of the bin, retort, extractor and receptacle, parts being broken away.

Fig. 7C is a feeder detail and Fig. 8C a flow diagram.

Fig. 9C is a side elevational view of my combined retort and extractor, parts being broken away.

Fig. 10C is a part elevational and part sectional view showing the means for lifting the upper cover head of the vessel.

Fig. 11C is a part elevational and part sectional view, on an enlarged scale, showing the joint between the spider and strainers.

Fig. 12C is a flow diagram.

Fig. 13C is an elevational detail view showing the means for lowering the bottom cover head of the vessel.

Coffee extractors, percolators, coffee makers and devices for home use and for making greater quantities of coffee are of a great variety and the art of making the beverage, using various devices need not be set forth in detail except as applied to extracting concentrates of pure coffee without boiling and hot water.

My extractor provides a clear finished liquid coffee concentrate of a 10 to 15 percent total solids viscosity, and 25 to 30 percent when pre-treated by steam, as in my retort hereinafter more fully described. In either case the concentrate is completely clarified and filtered ready for immediate further processing, such as dehydration to produce a finished perfect cup of pure soluble coffee or frozen filtered liquid coffee concentrate and to produce instant liquid coffee.

Dehydrating the concentrate produces pure soluble powdered coffee. The concentrate may be further processed for many other new types or forms of use in the rapidly expanding adaptations of coffee as a beverage for instant preparation and use, whether frozen, unfrozen, diluted or mixed in the cup, instant coffee depending on the concentrate extracted from the coffee bean, which is first ground, powdered or pre-treated in my retort before entering my extractor.

My experiments and tests and the use of my extractor and retort in daily practice show that water at one hundred eighty degrees Fahrenheit added to the extractor mass as well as steam under pressure quickly added in my retort produce the greatest yield and the best flavor.

My preferred method and process for example consists of conveying and feeding coffee, after being prepared and ground or powdered by any of the well known methods, such as will pass through a screen of 160 mesh per inch, into my retort, which is then closed pressure tight and supplied with steam under pressure of not more than 150 pounds per square inch gauge with the temperature of the steam not less than 212° F. and not more than 360° F. for a period of time only sufficient to penetrate each particle in the mass of coffee in the retort, usually not more than fifteen minutes. The steam pressure is then released, the retort inverted and opened by removing its cover to empty the steamed coffee to partially fill my extractor, above the lower screen and below the upper screens, leaving a space at the top for substantially an equal weight of warm water. Water is added to keep substantially an equal hydraulic pressure head on the coffee mass below, causing the concentrate, while progressively increasing in viscosity, to be drained off by gravity. The temperature of the water added to the coffee in the extractor is 180 degrees Fahrenheit.

It is to be noted here that the steam temperature is greater than 212 degrees Fahrenheit, but no concentrate or flavor is extracted in the retort. The change of pressure and temperature in the retort penetrates each particle to cause a change in structure from solid to porous without changing the flavor. The temperature of the water in the extractor which penetrates the porous particles of coffee if above 180 degrees Fahrenheit causes the concentrate to become bitter and distasteful; if the temperature of the water is less than 180 degrees Fahrenheit the time required as well as the percent of soluble solids is changed; the time increased and solids decreased as the water temperature is decreased.

The water penetrates into the coffee mass slowly at the beginning of the extracting cycle thus driving excessive air or carbon dioxide from within the individual coffee particles down through the coffee mass, the bottom filtering screens and perforated bottom plate into the drainage chamber. The air and gas are thus forced out continuously through the vent and from the coffee mass allowing the upper weight of water to force the water and increasing concentrate down through each individual particle of coffee. The bottom drainage valve is open at all times during the extraction cycle and is used to shut off the escape of surplus wash or residue after the basic coffee concentrate has been extracted.

Starting at the top of the coffee mass, the water, as it enters is turned at once into a 1 percent total solids concentrate by immediate contact with the coffee particles. As this light concentrated coffee liquid descends, it slowly penetrates through and beyond each successive coffee particle of each layer or level and picks up in viscosity and becomes increasingly heavier in extractable total soluble solids until the liquid reaches and passes through the filtering screens and bottom plate. The concentrate builds up viscosity throughout its downward passage through each particle and the mass where it is delivered at 10 to 15 percent total solids without the retort and 25 to 30 percent total solids within the retort and presteaming; the time elapsed being 2 hours for ground unsteamed coffee and 12 to 16 hours for powdered presteamed coffee, which is then drained off to complete the cycle of operations after emptying the extractor, by removing the cover and inverting it or tilting the extractor to gravitate into the container for carrying away the grounds or dross. After washing out, the extractor is made ready for the next cycle.

Any type of coffee or coffee grown anywhere may be used in my retort and extractor and any combination or blends and types may be used successfully. The shade or color of the roasted coffee may be a light roast or a full commercial roast, depending on whether the product is used for dehydrated powdered coffee or frozen instant coffee or for flavoring ice cream, cakes or other food products. The color of the roasted coffee is also determined by the regional preference in the particular section of the country in which my extractor is used. The shade and color as well as type used determine the taste in the pure liquid concentrate.

In the past many attempts have been made to obtain a clear filtered polished coffee concentrate in a short period of time. Continuous percolation or other methods such as pumping from one extractor to another result in an extract of harsh bitter residue. Too much essence is extracted from the coffee bean thus to cause a colloidal mass to hang in suspension in the concentrate; excessive extraction, through soaking or percolation extracting also results in undesirable gums and oils in solution which cannot be centrifuged out; they prevent the successful process of dehydration.

My method, process and apparatus overcome the previous difficulties in extracting coffee concentrate which is the base for various operations such as dehydration and frozen concentrate.

Also, it has been found by the use of my process in which the extractor is used with ground coffee, in which 10 or 15 percent solids are extracted in a period of 2 hours, substantial savings in material and working space in the coffee plant are realized. Compactness is combined with efficiency and the excellence of the product as well as the requirement for a few extractors rather than many for a given production, the elimination of pressure filtration and the ease of disposing with the dross and dregs add to the other savings by the use of my extractor.

By the use of my retort and steam treatment some of the advantages, such as the short period of extraction, as well as the simplicity of the system, are sacrificed for a greater yield of concentrate per pound of coffee, 25 to 30 percent of heavy concentrate or solids are extracted in 12 to 16 hours as compared to 10 to 15 percent in 2 hours without the use of the retort and steam. Powdered coffee and the structural changes to each particle cause the possible difference, a greater penetration and thus a longer period of filtration result in the greater yield per pound from the same extractor, the quality of the concentrate remains the same. The greater yield is accomplished without losing the quality of taste and aroma by the use of my retort and extractor.

I have not attempted to show and describe all of the modifications possible but rather to set forth a preferred embodiment in sufficient detail so that one skilled in the art of commercial coffee concentrate production may understand the construction, method and process and practice its use. Modifications may suggest themselves after a study of this my disclosure.

The preciseness of the detailed description and the preciseness of the details of the drawings are not intended to limit the scope of my invention which is set forth in the appended claims.

Referring to the drawings I have shown my extractor apparatus as comprising a vessel 1 having a cylindrical side 2, a removable top cover 3 and a conical bottom 4 with a suitable drain valve 5 for continuously delivering the liquid concentrate to the receptacle 6 where it may be gathered to add to the liquid at the top of the vessel or, when finished, to be further processed or shipped.

Within the vessel on the inner surface of side 2 I have provided a narrow annulus 7 on which the lower strainers and their retainer 8 rest to seal against leakage both with respect to the annulus and also the interior surface of the side wall as shown, particularly in Fig. 4 of the drawings and as hereinafter more fully described.

The vessel 1 is mounted on the trunnions 9 which rotate in the bearings 10 to permit the vessel to be tilted and partially inverted to empty the coffee grounds or dross 11, as shown particularly by broken lines in Fig. 2, into the waste receptacle 12; the cover 3 being removed after the extraction of the concentrate has been concluded.

The bearings 10 are preferably adjustably mounted in the vertical guides 13 of the frame 14 which are sufficiently high above the floor to substantially conform to the height of the vessel 1 for shipping. The girth clamp-band 15 to which the trunnions are secured may be moved longitudinally on the exterior of the vessel by unscrewing the clamp screw 16, thus to position the trunnions to substantially balance the vessel and its contents or to secure the vessel in its lowered position as when packed for shipment.

The bearings may be vertically adjusted by moving the bearing securing screw 17 from one set of holes 18, in the frame to another set. Each bearing also has a plurality of holes vertically positioned to receive the screw 17 all to give the desired vertical adjustment for the bearings and vessel to permit a larger or smaller receptacle 6 to be placed under it and to provide the desired height for filling the vessel with coffee and warm water which is not less than 125 degrees and not more than 200 degrees; 180 degrees Fahrenheit being preferable.

My strainers are of a diameter, when combined with the retainer 8, to slidably fit the interior of the cylindrical vessel and thus to seal against leakage of the particles of coffee and also the concentrate. The lower retainer also seats as a gasket, held by the strainers and the mass of coffee and water above, thus to seal more tightly against leakage past the annulus which serves as a seat.

My strainers comprise the superimposed fine mesh stainless steel strainer units 19 and 19', the coarse strainer 20 and the heavy apertured head 21 which are suitable to carry the entire weight of the contents of the vessel and to permit the concentrate to pass through. The retainer 8 is preferably of strong flexible fabric, formed like a band, having a diameter substantially equal to the diameter of the strainers and head. The strainers 19 and 19' may be of the order of one hundred mesh per inch.

The two marginal edges of the retainer 8 are tubular hems into which a pair of draw strings 22, one in each hem, are free to move and when tightly drawn and knotted as indicated at 23 cause one of the edges of the retainer to be drawn over and the other edge under the peripheries of the several strainers and head thus securing them together as a unit and also providing packing to prevent leakage around the strainers and the side wall 2 of the vessel.

The upper and lower strainer units are substantially duplicates and each may be easily removed from the vessel and each may be taken apart by removing the retainer 8, which is easily done by untying the knots 23 at the ends of the draw strings.

To hold the vessel at any desired position, such as upright, as when extracting the coffee concentrate, or partially inverted, as when emptying the used coffee grounds or dross and when cleaning the extractor for its next operating cycle, I have provided the clamp screws 24 and their lever handles 25, one end of which handle engages any one of the plurality of apertures 26 in the clamp screw heads 27.

The sides 28 of the frame 14 are held in spaced relationship by the rear gusset plate 29 so that the vessel is free to rotate between the sides and to provide the space under the vessel for the receptacle 6.

The size of my extractor may vary for coffee concentrate production, however the depth of the mass of coffee must be sufficient to extract the soluble solids as the water and concentrate filter from top to bottom. The system and apparatus herein described are not intended for domestic, home use but rather for large commercial production.

Referring particularly to Figs. 6C, 7C, and 8C I have shown a vessel 30 for coffee roasted and ready for the mill 31 from which the conveyor 32 carries the ground and powdered coffee to the storage bin 33 and feeder 34 which delivers the coffee through the chute 35 to the retort 36 which is provided with a removable pressure tight cover 37 which is provided with the apertures or nozzles 38 through which steam enters into the coffee mass 39 under control of valve 40 which admits steam to pass through the hollow trunnion 41, duct 42 into the steam chamber 43 to supply the nozzles 38.

Removal of the cover 37 disconnects the duct 42 from the chamber 43 and the cover may be moved to one side as by the electric trolley and hoist 44, the cable and hook 45 of which engages the eye 46 of the clamp 47 which removably secures the cover pressure tight to the retort 36 and duct 42.

When the retort is being charged with steam the cover is at the bottom and the air vent valve 48 is at the top to insure a quick and complete charge of steam to the entire mass of coffee.

When the retort is inverted, as when swung on its trunnion 49 and hollow trunnion 41 the cover is at the top and, when removed, may be swung to one side as when filling the retort with coffee or when inverted to empty its steamed contents into the chute 50 and extractor which has a vessel 1 and the other parts, fully described in my application Serial Number 264,965. I have however added a vent 51 leading to the interior of the conical bottom 4 and extended above the water at the top of the extractor as shown in the patent to Dubois #2,084,938.

The chute 50 is swung out of place and to one side by the swing joint or hinge 51' when desired, as when removing the cover. I have provided a hot water pipe and nozzle 52, which may be swung over the extractor as when adding the hot water or may be swung to one side on its swing joint 53, which is provided at the end of the supply pipe 54, which is provided with the control valve 55.

The cover 3 is moved to one side by the electric trolley 56 or any suitable means which engages the handle 3'.

The hot water pipe 54 may be connected to any suitable hot water heater and the steam pipe 57 to steam generating means as a boiler. The water heater and boiler or other sources are not shown as these are well known and universally used for many purposes. Likewise coffee mills, grinders, roasters and other apparatus for providing ground, cracked or powdered coffee are in use and well known. The coffee which will pass through a 160 mesh screen is preferable and may be used in my process.

Referring particularly to Fig. 8C I have shown a flow diagram in which the sequence of operations is illustrated. The coffee vessel 30 and the mill 31 provide the desired blends, roasting, fineness of coffee before it enters the bin 33 as through any suitable conveying means 32 and is dispensed in the desired quantity through the feeder 34 and a suitable chute 35 or other conveying means into the retort 36 where each particle of the mass confined within the retort is changed in its physical structure by steam under pressure, then changed or again altered in its physical structure by expanding in character by a reduction in pressure and temperature and each particle as well as the mass of coffee particles is ready to enter the extractor 1 where water at 180 degrees is admitted above the coffee mass wherein the water is absorbed, each particle of coffee yielding its flavor to the water as it gravitates into, by and beyond each particle. The water is applied for a period of not less than 90 minutes and not more than 150 minutes.

Referring particularly to Figs. 9C to 13C I have shown my combined retort and extractor 60 which has a pressure tight vessel 61 closed at the top with the removable cover head 62 and at the bottom with the removable cover head 63 and supported by the frame 63' to which it is fixed with relation to the structure 64 which also supports the overhead electric hoists and trolleys 44 which are provided with the hooks 45 or the eyes 65 suitable to raise and lower the heads 62 and 63 and to carry them to one side for filling or removing the coffee or dross 11 and for cleaning, for adjustments and repairs to the interior of my apparatus and to the vessel 61, which is smooth and free of obstructions from one end to the other to permit the passage of the retainers 8 and the strainer units hereinbefore described.

The retainers 8 pack the strainers aginst leakage of both coffee and concentrate between the strainers and the interior smooth walls of the vessel 61. The strainers at the bottom of the mass of coffee as well as the coffee are supported by the top rim 66 of the bottom spider 67 which is preferably secured to the bottom head 63 and all removed together when the head is lowered to permit the coffee grounds or dross to flow around it into the funnel 68 and receptacle 6. The top spider 69 which is preferably secured to the top head 62 rests on the retainer 8 of the top strainer unit. Spring clips 70 which are inserted under the edge and draw string 22 of the strainer unit and over the lower rim 71 of top spider 69 as may be seen in Fig. 11C.

Both the top spider 69 and bottom spider 67 are spaced apart from the side wall of the vessel 61 and each includes an annular body with spaced openings 72 forming top and bottom rims 71. Water, steam and air may freely flow through the space between the annular bodies and side wall and through the openings 72 in the annular bodies.

Steam is supplied through the bottom spider into the chamber 73 below the coffee mass through which it flows upwardly driving the air before it and out of the air valve 74 at the top of the upper chamber 75 above the coffee mass. The steam pipe 76, connected to the chamber 73 is provided with the control valve 77 and the steam pressure is indicated in the bottom chamber by the gauge 78 and the steam pressure in the top chamber 75 by the pressure gauge 79, when the gauges 78 and 79 are showing the same pressure it is known that the mass of coffee has been penetrated with steam. The gauges or thermometers 80 and 81 show the respective temperatures in the top and bottom chambers and the indicators 82 and 83 show the viscosity and hydrometer readings, an instrument panel 84 being provided on the front of my retort and extractor to indicate the conditions within.

Water is supplied at the desired temperature through the pipe 85 and control valve 86 to the top chamber 75 after which it filters down through the top strainers and coffee mass where it increasingly becomes changed to coffee concentrate, for instance as it passes the top level of the coffee mass, upon contact with the coffee, one percent of solids will have been absorbed and as this one percent concentrate filters down through to lower levels it becomes 10 percent, then 20 percent and by the time, 12 to 16 hours later, it passes the lowest level of the coffee mass the concentrate becomes 30 percent coffee solids.

At the top of the bottom chamber 73 and under the strainers and coffee mass I have connected a vent pipe 89 which has the shut off valve 88 to close the vent when the retort and extractor is under pressure as when being charged with steam. The spreader 87 is used for lowering the head.

The bottom head is lowered, as when the grounds or dross is emptied by means of the crane and hoist 44 the hooks 45 of which engage the cross bolts at the ends of the spreader 87 to thus prevent the hoist from contacting the sides of the vessel 61 since the ends of the spreader extend beyond the sides of the heads and the securing bolts, which are suitable to engage their slots and the flange of the head so that they are easily swung to one side or removed for removing the heads. Two of the upper swing bolts diametrically opposed serve to remove the top head by engaging the hooks 45 of the hoists and trolley 44.

The operation of my retort and extractor is by raising the lower head 63 and securing it in place with the lower strainers ready to receive the coffee from the chute 35 which fills the vessel 61 to the level desired after which the upper head is lowered and secured in position to close the top of the pressure vessel and to cover the top of the coffee mass with the upper strainers.

The valves 74, 86 and 88 are then closed and the valve 77, and later the valve 74 are opened permitting the coffee mass to be charged with steam, which as soon as it appears escaping from the valve 74 this valve is closed to cause steam pressure to build up in the pressure vessel after which the valve 77 is closed and the valve 74 opened to reduce the pressure, then closed and the valve 86 opened together with the valve 88 and valve 5 through which the concentrate is taken off, the valve 86 being closed when the desired amount of water is admitted.

The upper chamber 75 is of sufficient capacity to hold the desired amount of water to provide the concentrate. The pressure gauge or the vent valve at the top may serve to indicate just the proper time to close the valve 86. The flow diagram, Fig. 13C shows the simplified handling of coffee when using my combined retort and extractor. Charging the coffee mass with steam and extracting the concentrate are done without handling the coffee. The construction also handles the coffee and the disposal of the grounds and dross without handling the retort or the extractor as this combined device remains fixed. The operations are simplified and reduced even when processing large masses of coffee, thus producing the maximum of quality concentrate at the minimum cost.

In the extractor the mass of coffee is held during the period of infiltration and extraction for twelve to sixteen hours, depending on the depth and the size of the particles in the mass of coffee. Forty eight inches, for instance requires sixteen hours, during which time the concentrate is discharged through the valve 5 into the receptacle 6 leaving the dross to be discharged by removing the cover of the extractor and inverting so as to be discharged into the waste receptacle 12 as may be seen by referring to Fig. 2 of the drawings.

The period of infiltration is increased and a greater percentage of usable high quality of extracted concentrate is obtained by my retort and the pretreatment of the coffee by steam and the consequent change of structure as hereinbefore described. Ten to fifteen percent of soluble solids is recoverable without the retort and steam treatment while as high as thirty percent has been recovered when the retort and steam pretreatment is used, the quality and taste remaining the same.

Having thus described a preferred embodiment of my invention what I claim as new and desire to secure by Letters Patent is set forth in the following claims:

I claim:

In combination, an invertible cylindrical vessel for coffee and water, a plurality of strainers fitting the interior of said vessel in units above and below the coffee and slidable within said vessel, girthwise detachable band retainers disposed in part around said strainers, the edges of each of said band retainers gathered above and below each unit of said strainers to removably secure said strainers in said retainers and to hold said strainers together as a unit and packing the periphery of said strainers against leakage between said strainers and the walls of said housing, and spider devices associated with each band retainer, each device including an annular body with spaced openings therein and substantially C-shaped spring clips having their ends removably engaging the edge walls of the openings and the adjacent edges of the band retainers.

References Cited in the file of this patent

UNITED STATES PATENTS

| Number | Name | Date |
|---|---|---|
| Re. 15,707 | Simonton | Oct. 30, 1923 |
| Re. 22,022 | Peters | Feb. 10, 1942 |
| Re. 22,879 | Peters et al. | May 13, 1947 |
| 389,079 | Huff | Sept. 4, 1888 |
| 837,834 | Herrera | Dec. 4, 1906 |
| 1,075,727 | Reichert | Oct. 14, 1913 |
| 1,123,828 | Metzger | Jan. 5, 1915 |
| 1,365,443 | Anhaltzer | Jan. 11, 1921 |
| 1,535,769 | Gallardo | Apr. 28, 1925 |
| 2,047,172 | Coleman | July 14, 1936 |
| 2,088,966 | Lyons | Aug. 3, 1937 |
| 2,263,610 | Cain | Nov. 25, 1941 |
| 2,282,138 | Kellogg | May 5, 1942 |
| 2,385,132 | Graham | Sept. 18, 1945 |
| 2,432,759 | Heyman | Dec. 16, 1947 |
| 2,562,206 | Nutting | July 31, 1951 |
| 2,712,501 | Hale | July 5, 1955 |
| 2,750,871 | Landgraber et al. | June 19, 1956 |
| 2,770,181 | Kahan | Nov. 13, 1956 |
| 2,826,980 | Willman | Mar. 18, 1958 |